United States Patent [19]
Alexoff

[11] 3,754,428
[45] Aug. 28, 1973

[54] METHOD AND APPARATUS FOR SEVERING TUBING

[75] Inventor: Peter Alexoff, Poland, Ohio

[73] Assignee: George A. Mitchell Company, Youngstown, Ohio

[22] Filed: July 28, 1972

[21] Appl. No.: 275,924

[52] U.S. Cl. .................. 72/331, 72/325, 72/332, 72/338, 72/339, 83/54
[51] Int. Cl. ............................................ B21d 31/02
[58] Field of Search ................ 72/331, 332, 325, 72/338, 339, 304; 29/417; 83/54

[56] References Cited
UNITED STATES PATENTS

| | | | |
|---|---|---|---|
| 3,298,213 | 1/1967 | Szel | 72/186 |
| 3,145,462 | 8/1964 | Bognar | 29/417 |
| 2,572,137 | 10/1951 | Grieder | 83/54 |
| 1,981,059 | 11/1934 | Matthews | 83/54 |
| 2,670,795 | 3/1954 | Griep | 83/54 |

Primary Examiner—Charles W. Lanham
Assistant Examiner—James R. Duzan
Attorney—Thomas H. Murray et al.

[57] ABSTRACT

Method and apparatus for severing tubing using a conventional pointed shearing blade acting in one motion which fails to produce undesirable inwardly extending deformations. The normal circular shape of the tubing is deformed in jaws prior to shearing to include a portion projecting outwardly from the exterior surface of the tubing and presenting an apex. Then, beginning at the apex, the tubing is severed while the projecting portion is simultaneously reshaped to conform substantially with the normal circular shape of the tubing.

15 Claims, 12 Drawing Figures

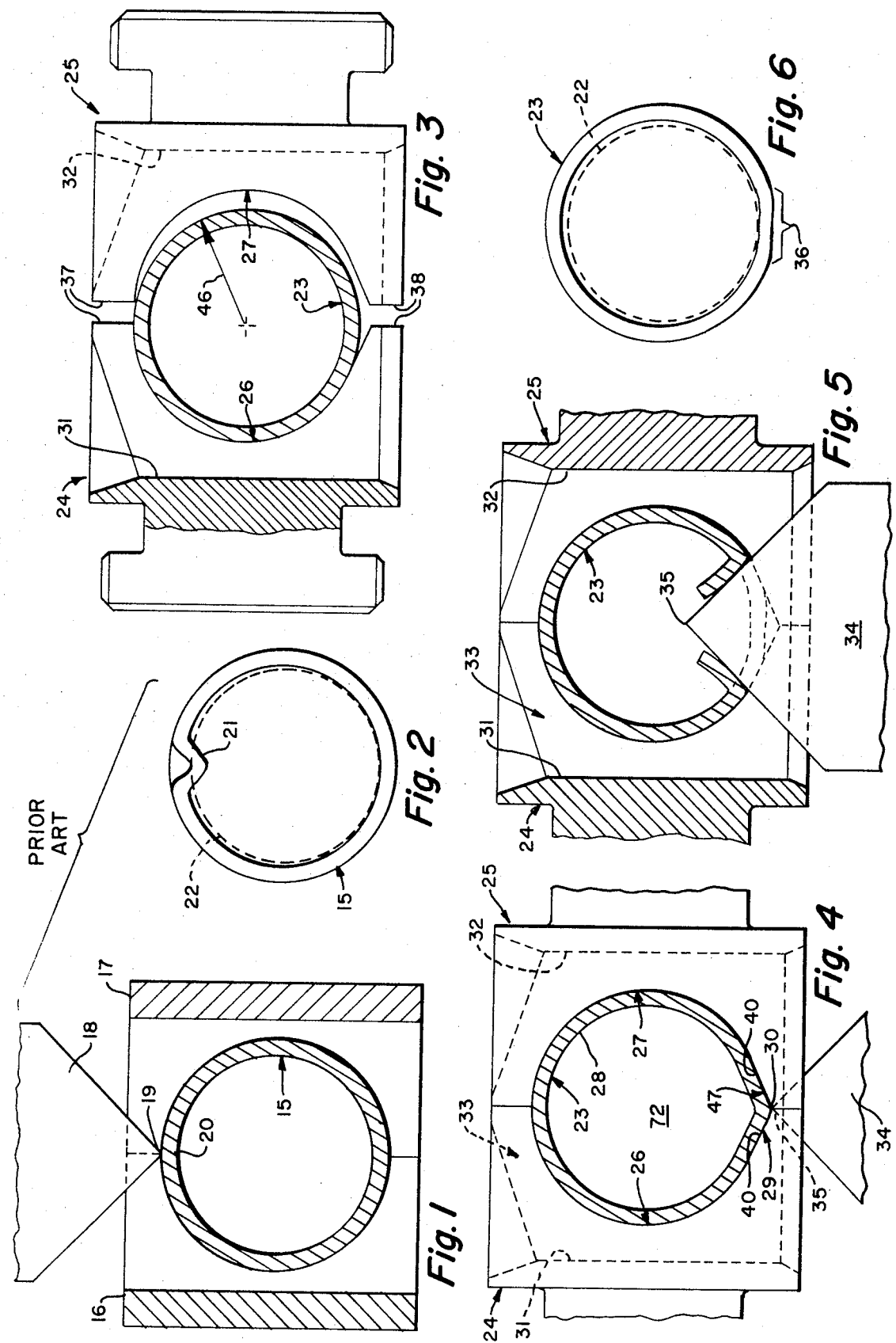

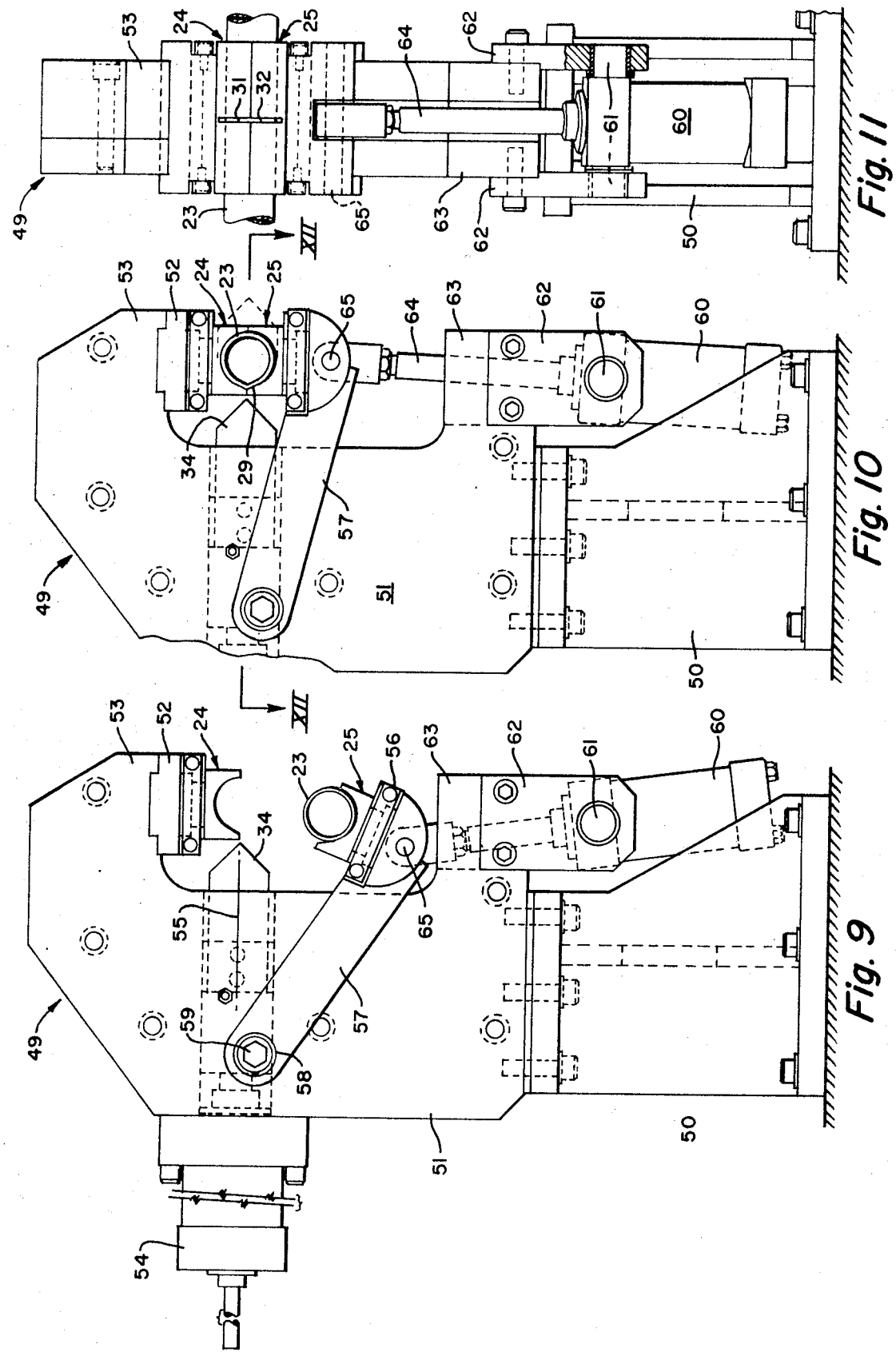

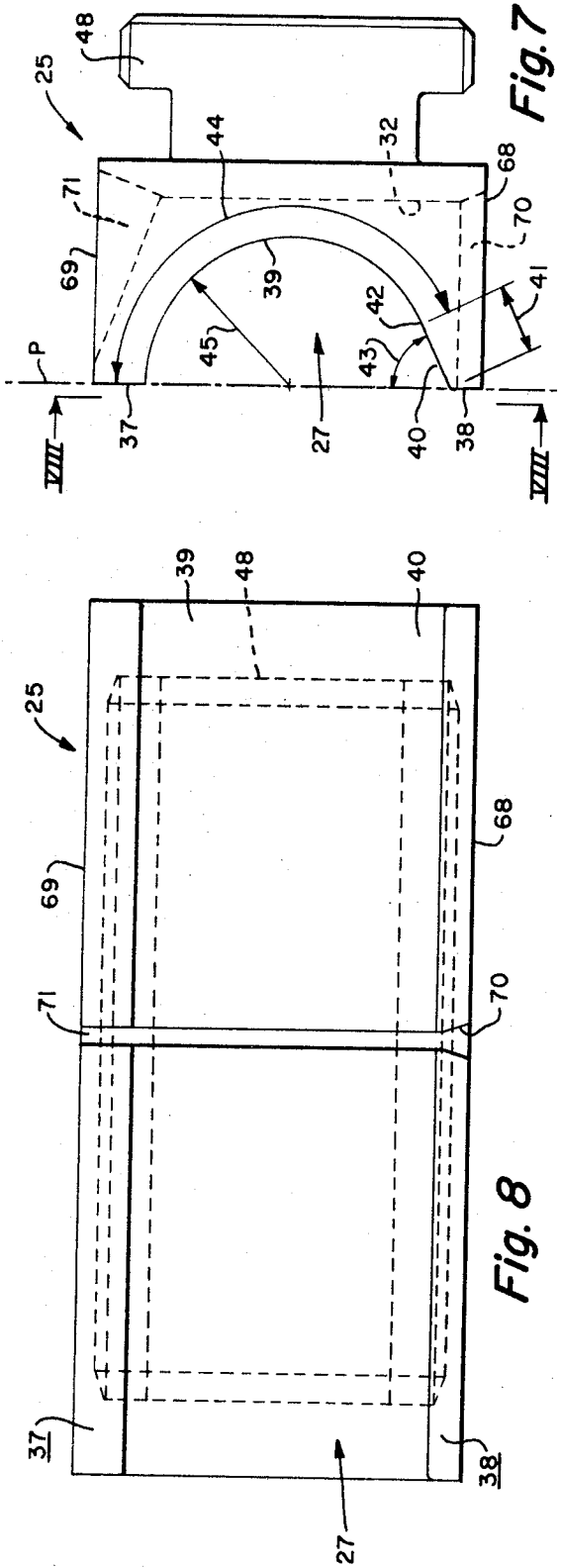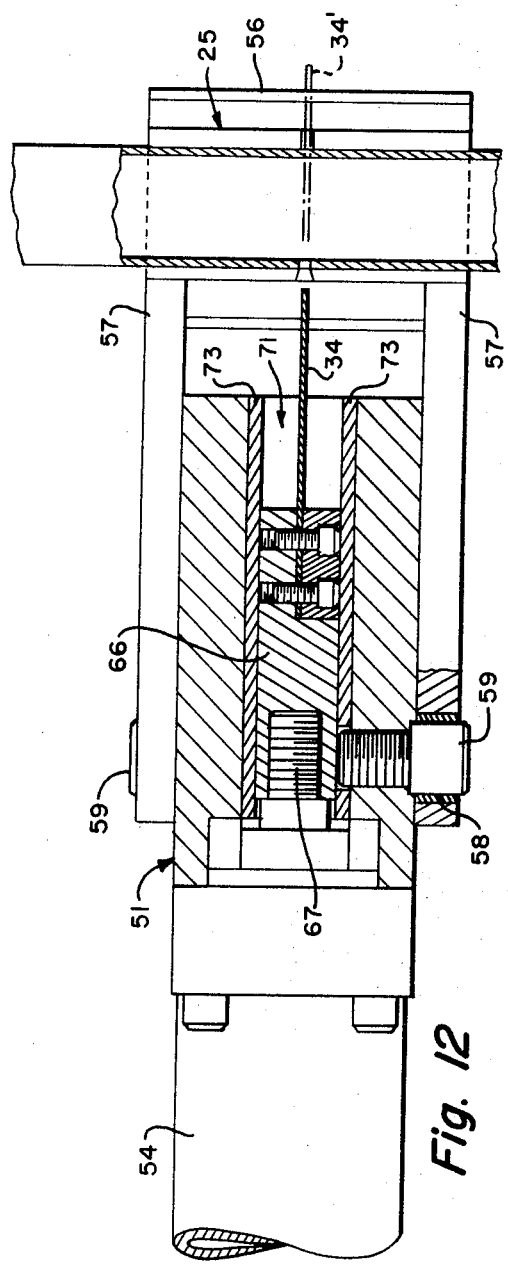

METHOD AND APPARATUS FOR SEVERING TUBING

BACKGROUND OF THE INVENTION

1. Field of the Invention

This invention relates to a method and apparatus for severing tubing with one motion of the blade, and more particularly, to a method and apparatus for severing tubing wherein the severed ends of the tubing on both sides of the shear conform substantially with the normal circular shape of the tubing.

2. Description of the Prior Art

In tube drawing operations, the diameter and wall thickness of the tube are reduced by drawing the tube over a stationary mandrel and through the drawing die of a drawbench, bull block or the like. The length of the tube also is increased after each drawing operation. At certain stages in the drawing operation, the tubing must be cut to provide a number of shorter sections for continuing the drawing operation.

Tubes are cut by sawing or by shearing using various types of shears. The sawing method has the disadvantage of leaving adhering saw cuttings which are detrimental to any subsequent drawing operations. The shearing method overcomes the disadvantage of the sawing method. However, most shearing methods have the disadvantage of partially crushing the severed tube ends whereby a slight inward fold (deformation) occurs at the severed ends. The depth of the deformation depends in part on the degree to which the tube has been previously cold finished. The deformation exceeds the yield point and persists after the tube has been cut. The slight inward fold reduces the free open end of the tube and impedes the introduction of a mandrel.

SUMMARY OF THE INVENTION

The principal object of this invention is to provide a method and apparatus for severing tubing in one stroke of the shear blade which avoids the formation of interfering inward deformations.

A further object of this invention is to provide a method and apparatus for severing tubing wherein a conventional pointed shearing blade used to cut the tubing, fails to produce any interfering inward deformations.

In accordance with the invention, the normal circular shape of a segment of the tubing to be cut is deformed by a gripping mechanism to include an arcuately shaped portion of reduced diameter and an outwardly projecting portion extending lengthwise of the tube segment. The outwardly projecting portion has a generally V-shaped configuration and presents an apex. Then, beginning at the apex, the tubing is severed while the projecting portion is reshaped to conform substantially with the normal circular shape of the tubing.

The deformation of the tubing is achieved by forcibly clamping the tubing between opposing die members having identical cooperating longitudinal cavities which deform the tube segment in the manner described above. The jaw members have complementary slots which cooperate to provide a passageway extending transversely through the jaw members. A conventional pointed shearing blade is supported in alignment with the passageway and is arranged to sever the tubing by first engaging the apex. During the shearing operation, the projecting portion of the tubing is reshaped by inward deformation, to conform substantially with the normal circular shape of the tubing. The initial outward deformation of the tubing work-hardens the thus formed V-shaped portion, whereby during the shearing operation —reshaping of the projecting portion, the extent of inward deformation is automatically limited. Thus, no interfering inward deformations are formed in either of the severed tube ends, notwithstanding the fact that a conventional pointed shearing blade is used.

BRIEF DESCRIPTION OF THE DRAWINGS

FIGS. 1 and 2 illustrate a prior art method of severing tubing and the resultant profile of a severed tube end;

FIGS. 3–5 illustrate a method of severing tubing in accordance with the present invention;

FIG. 6 illustrates the profile of the substantially undeformed end of the tubing severed by the method of this invention;

FIG. 7 is an end view of one of a pair of identical jaw members employed in the apparatus of this invention;

FIG. 8 is a plan view of the jaw member as viewed from the line VIII—VIII of FIG. 7;

FIGS. 9 and 10 are side views of the present tube severing apparatus illustrating the opposing jaw members in open and closed positions, respectively;

FIG. 11 is a front view of the apparatus of FIG. 10; and

FIG. 12 is a fragmentary cross-sectional view taken along the line XII—XII of FIG. 10.

DESCRIPTION OF THE PREFERRED EMBODIMENT

In the prior art method of using pointed shears (FIG. 1) the tube 15 to be cut is held between opposing jaw members 16, 17. A conventional shearing blade 18 having a leading pointed end 19, is used to sever the tubing 15. During the shearing operation, that tube portion 20 which is initially engaged by the blade point 19 is partially crushed, whereby a slight fold 21 (FIG. 2) is formed which persists after the shearing operation. The slight fold 21 is formed in both severed ends of the tubing 15. The fold 21 restricts the free open end of the tubing 15 and impedes the introduction of a mandrel schematically illustrated by the dotted line 22. In accordance with past procedures, the fold 21 was eliminated, for example, by hammering operations.

In accordance with the present invention, a tube 23 (FIG. 3) to be cut is forcibly clamped between opposing jaw members 24, 25 having cooperating longitudinal cavities 26, 27. The cavities 26, 27 are shaped such that upon forced movement of the jaw members 24, 25 toward each other (FIG. 4), the normal circular shape of the tube 23 is deformed to include an arcuately-shaped portion 28 and an outwardly projecting V-shaped portion 29 having an apex 30.

The jaw members 24, 25 have complementary slots 31, 32 which cooperate to provide a passageway 33 (FIG. 5) extending transversely through the jaw members 24, 25. A shearing blade 34 (FIG. 4) having a leading pointed end 35 is supported in alignment with the passageway 33 and is arranged to have its leading pointed end 35 engage the apex 30 during the initial stages of the shearing operation. As the blade 34 shears the tube 23, the original V-shaped portion 29 (FIG. 4) is reshaped by inward deformation (FIG. 5) to produce an arc segment 36 (FIG. 6) which conforms substantially with the original circular shape of the tube 23. As can best be seen in FIG. 6, the free open end of the tube 23 is substantially unrestricted such that the introduction of the mandrel 22 is not impeded.

It should be understood that both ends of the tube 23 on opposite sides of the shear have identical substantially circular profiles and both are free of interfering inward deformations.

The configuration of the jaw member 25 will now be described with reference to FIGS. 7 and 8. Since the jaw members 24, 25 are identical, the following description also applies to the jaw member 24.

It will be observed in FIG. 7 that the jaw member 25 presents spaced-apart faces 37, 38 which reside in a common plane P and on opposite sides of the cavity 27. The cavity 27 includes an arcuate surface portion 39 extending from the face 37 and terminating in a tangential flat surface portion 40 having a width indicated at 41. The flat surface portion 40 is tangential to the arcuate surface portion 39 at 42. The flat surface portion 40 is inclined at an acute angle 43 with respect to the common plane P. The angle 43 may be in the range of 60 to 65 angular degrees. Thus, the circumferential length 44 of the arcuate surface portion 39 may be in the range of 150 to 155 angular degrees depending on the inclination angle 43 of the flat surface portion 40. It will be appreciated that the jaw members 24, 25, when positioned with the cavities 26, 27 in confronting relation, present a lengthwise bore 72 (FIG. 4) having a cross section which is partly circular and partly V-shaped. The circular portion of the lengthwise bore 72 corresponds to the combined circumferential length 44 (FIG. 7) of the arcuate surface portion 39, while the V-shaped portion corresponds to the V-shaped trough 47 (FIG. 4).

The arcuate surface portion 39 has an inner radius 45 which is slightly less than the outer radius 46 (FIG. 3) of the tube 23 to be cut. For example, where the outer radius 46 of the tube is 1.039 inches, the inner radius 45 of the jaw members 24, 25 is 1.031 inches. This small difference between the tube and jaw member radii is such that when the jaw members 24, 25 are forcibly moved together, tube wall material is forced to conform with the generally V-shaped trough 47 (FIG. 4) defined by the converging flat surface portions 40. Thus, it will be appreciated that clamping of the tube 23 between the jaw members 24, 25 is accompanied by a minor reduction in the outer diameter of the portion or segment of the tube 23 between the opposing jaw members 24, 25.

Referring to FIGS. 7 and 8, the slot 32 extends completely through the jaw member 24 and is provided with a widened entrance 70 at the jaw face 68 and an exit 71 at the jaw face 69.

Referring again to FIGS. 7 and 8, it will be observed that the jaw member 25 is provided with a T-shaped base 48 used in securing the jaw members 24, 25 to jaw support members.

A tube serving apparatus 49 incorporating the jaw members 24, 25 is illustrated in FIGS. 9–12. Referring to FIG. 9, the apparatus 49 includes a base 50 on which is mounted a C-shaped frame 51. A jaw carrier 52 carrying the stationary jaw member 24, is secured to the upper arm 53 of the C-shaped frame 51. Motor means, such as a hydraulic cylinder 54, is carried at one side of the frame 51 for moving the shearing blade 34 reciprocally along its longitudinal axis 55, i.e., toward and away from the stationary jaw member 24.

The movable jaw member 25 is supported on a second jaw carrier 56 which is secured to a pair of lever arms 57 (see FIG. 12). The remote end of the lever arms 57 (FIGS. 9 and 12) are pivotal about bushings 58 surrounding bolts 59 which are threadedly connected to the opposite sides of the C-shaped frame 51. The lower arms 57 define the locus of movement of the movable jaw member 25 toward and away from confronting relation with the stationary jaw member 24. Motor means, such as a second hydraulic cylinder 60, is pivotally supported on lugs 61 (FIG. 11) extending through spaced support plates 62 secured to the lower end 63 of the C-shaped frame 51. The second hydraulic cylinder 60 has a piston rod 64 pivotally connected to the second jaw carrier 56 as at 65. It will be appreciated that energization of the cylinder 60 causes forced movement of the movable jaw member 25 into confronting relation with the stationary jaw member 24 as shown in FIG. 10, while the movement of the jaw member 25 is guided by the lever arms 57. Thus, the cylinder 60 and the lever arms 57 constitute cooperating means for forcibly moving and guiding the movable jaw member 25 into confronting relation with the stationary jaw member 24.

After the tube 23 is clamped between the jaw members 24, 25, during which it is deformed to include the V-shaped portion 29, the cylinder 54 is energized causing forced movement of the shearing blade 34 through the cooperating slots 31, 32 (FIG. 11) to shear the tube 23. After the shearing blade 34 is retracted to the position shown in FIG. 10, the cylinder 60 is deenergized whereby the movable jaw member 25 is lowered to the position shown in FIG. 9.

Referring to FIG. 12, the shearing blade 34 is secured to a support plate 66 carried at the end of a piston rod 67 of the cylinder 54. The support plate 66 and the shearing blade 34 are reciprocal through an opening 71 in the frame 51—the support plate 66 being slideable between stationary plate bushings 73. The shearing blade 34 reciprocates between the retracted position illustrated in solid lines and a forward position illustrated in dash-dot outline at 34'. A side view of the retracted and forward positions of the shearing blade 34 is illustrated in FIG. 10.

From the foregoing description it will be appreciated that the present invention provides a method and apparatus for severing tube ends without creating any of the interfering deformations which are formed by prior art single motion tube shearing methods. The present method and apparatus incorporates a conventional pointed shearing blade which deforms the circular tube but fails to produce the interfering inward deformations.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. In the method of severing tubing, the steps of deforming the normal circular shape of said tubing to include an arcuately shaped portion and an outwardly projecting portion extending lengthwise of said tubing; and beginning at said projecting portion, severing said tubing while simultaneously reshaping said projecting portion to conform substantially with the normal circular shape of said tubing.

2. The method of claim 1 wherein said tubing is severed without deforming said arcuately shaped portion of said tubing.

3. The method of claim 1 wherein the severed ends of the tubing on both sides of the shear have substantially uniform inner diameters along the entire inner circumference thereof.

4. The method of claim 1 wherein said tubing is deformed by forcibly clamping the same between opposing jaw members having cooperating lengthwise cavities which present arcuate surface portions forming said arcuately shaped portion and which terminate in converging, tangential flat surface portions forming said projecting portion.

5. The method of claim 4 wherein clamping of said tubing is accompanied by a minor reduction in the outer diameter of that portion of said tubing between said opposing jaw members.

6. The method of claim 4 wherein said tubing is severed by passing a shearing blade transversely through cooperating slots presented by said opposing jaw members and while said tubing is clamped between said opposing jaw members.

7. The method of claim 4 wherein said shearing blade has a leading pointed end.

8. Apparatus for severing tubular workpieces comprising a pair of jaw members having cooperating longitudinal cavities shaped such that upon forced movement of the jaw members toward one another with a tubular workpiece therebetween, the normal circular shape of the workpiece is deformed to include an arcuately shaped portion and an outwardly projecting portion, said jaw members having completementary slots providing a passageway extending transversely through said jaw members, and a shearing blade supported in alignment with said passageway and arranged to sever the workpiece by first engaging said projecting portion and then reshaping said projecting portion to conform substantially with the normal circular shape of the workpiece.

9. The apparatus of claim 8 wherein one of the jaw members is stationary and the other jaw member is movable, and including cooperating means for forcibly moving and guiding the movable jaw member into confronting relation with the stationary jaw member.

10. The apparatus of claim 8 wherein each of said jaw members presents spaced-apart faces residing in a common plane and on opposite sides of said lengthwise cavity; and wherein each of said cavities presents an arcuate surface portion extending from one of said faces and terminating in a flat surface portion intersecting the other of said faces, said flat surface portion being tangent to said arcuate surface portion and intersecting said common plane of said spaced-apart faces at an acute angle.

11. The apparatus of claim 10 wherein said acute angle is in the range of 60 to 65 angular degrees.

12. A pair of jaw members for use in severing tubular workpieces, each of said jaw members having a lengthwise cavity and spaced-apart faces which reside in a common plane and on opposite sides of said cavity, said cavity presenting an arcuate surface portion extending from one of said faces and terminating in a flat surface portion intersecting the other of said faces, said flat surface portion being tangent to said arcuate surface portion and intersecting said common plane at an acute angle, said jaw members, when positioned with the cavities thereof in confronting relation, presenting a lengthwise bore having a cross section which is partly circular and partly V-shaped.

13. The jaw members of claim 12 wherein the combined circumferential length of said arcuate surface portions is in the range of 150 to 155 angular degrees.

14. The jaw members of claim 12 wherein said acute angle is in the range of 60 to 65 angular degrees.

15. The jaw members of claim 12 including cooperating slots extending transversely thereof and providing a transverse passageway for receiving a shearing blade.

* * * * *